W. F. ELY.
WAGON-BRAKE.
No. 192,819. Patented July 10, 1877.
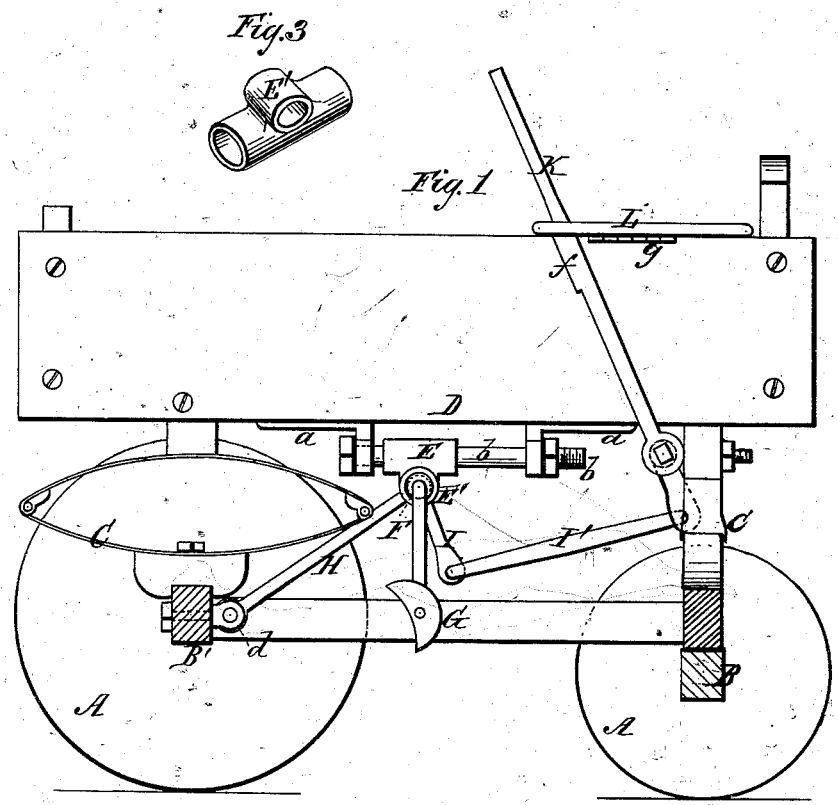
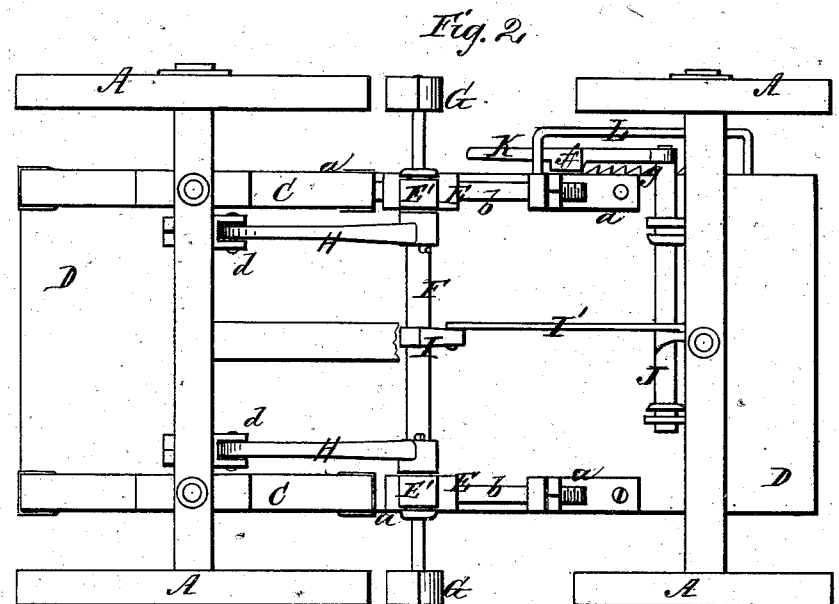

UNITED STATES PATENT OFFICE.

WILLIAM F. ELY, OF PLEASANTVILLE, MARYLAND.

IMPROVEMENT IN WAGON-BRAKES.

Specification forming part of Letters Patent No. 192,819, dated July 10, 1877; application filed May 29, 1877.

*To all whom it may concern:*

Be it known that I, WILLIAM F. ELY, of Pleasantville, in the county of Harford and State of Maryland, have invented a new and useful Improvement in Wagon-Brakes; and I do hereby declare that the following is a full, clear, and exact description of the same, reference being had to the accompanying drawings, forming part of this specification, in which—

Figure 1 is a side elevation of a wagon with my improved brake applied to it. Fig. 2 is an inverted plan of the same. Fig. 3 is a perspective view of one of the accommodating T-bearings of the brake.

The nature of my invention consists in certain constructions, combinations, and arrangements of parts, whereby the accommodating bearings, which are used for relieving the springs of the wagon from the great strain which would come upon them if they were rigid or fixed, are simplified, and rendered less liable to bind and interfere with the perfect operation of the brake.

In the accompanying drawings, A represents the wheels, B B' the axles, C C the springs, and D the body, of a wagon.

To the bottom of the body D of the wagon, on each side, brackets *a a* are firmly secured, and through each pair of these brackets a strong round screw-bolt, *b*, is passed, and fastened by a nut screwed on the end of the bolt. Before the screw-bolts are inserted, T-shaped tubular bearings E E' are placed between the respective pairs of brackets, so that the screws pass through their longitudinal parts E when they are passed through the brackets.

The cranked shaft F, which has the brake-blocks G G on its outer crank-arms, is passed through the transverse tubular part E' of the T-bearings, and bent in its cranked form afterward. This cranked shaft is connected, by radius-rods H H, to the hind axle B', said rods being fitted by tubular sleeves to the crank-shaft, and to the said axle by eyebolts *d d*, passed through the axle, and pivots passed through the eyes of these bolts and an eye on each of the rods.

A crank-arm, I, is attached to the crank-shaft, and this arm is connected, by a pitman, I', to another crank-arm of a shaft, J, which shaft has a lever, K, for operating it and the brake fastened to its end or to any other portion of it, as desired.

The lever K works back and forth in a guide-rail, L, and has a stop-rib, *f*, on its side, which rib takes into teeth of a lock-plate, *g*, and holds the brake up to its work as long as desired.

Operation: If it is desired to stop the wagon, the driver forces the lever forward, and thereby causes the crank-shaft to turn in its bearing E' sufficiently to force the brake blocks or shoes firmly against the wheels, and while operating the brake, any strain or jars which come upon the wheels or wagon-body will not fall upon the springs, but fall upon the hind axle, and as the bearings of the crank-shaft are free to slide back and forth accordingly as the radius-rods are raised or lowered, everything will work without danger of too great strain or liability of breakage under ordinary circumstances.

The round guide-bolts and the T-shaped bearings which work on them offer but very little friction, and there is very little liability of any "bind" between the sliding bearings and their supports, which is not the case when these bearings are constructed in form of a block and confined between upper and lower guides.

In the use of my brake the lever may be passed down through the bottom of the wagon, if desired, and the stop-bar should be located in proper relation to the lever thus arranged.

Having described my invention, what I claim as new, and desire to secure by Letters Patent, is—

1. The combination of the radius-rods H, hinged to wagon-axle B', the vibrating cranked shaft F, having brake-blocks G on its crank-arms, the T-shaped tubular bearings E E', and the guide-bolts *b*, substantially as and for the purpose described.

2. The T-shaped tubular bearings E E', sliding on the guide-bolts *b*, and having the cranked shaft F, which carries the brake-shoes G, passed through its tubular part E', substantially as described.

3. The combination, with the wagon-axle and the body of the wagon D, of the radius-rods H, cranked shaft F, T-shaped tubular bearings E E', guide-bolts $b$, pitman I', crank-shaft J, and hand-lever K, substantially as described.

Witness my hand in the matter of my application for patent wagon-brake.

WILLIAM FRANKLIN ELY.

Witnesses:
R. E. PRIGG,
RICHARD T. MARTIN.